United States Patent [19]

Hsu et al.

[11] Patent Number: 5,336,739
[45] Date of Patent: * Aug. 9, 1994

[54] ALKYL TETRAHYDROFURFURYL ETHERS AS ANIONIC POLYMERIZATION MODIFIER IN THE SYNTHESIS OF RUBBERY POLYMER

[75] Inventors: Wen-Liang Hsu, Copley; Adel F. Halasa, Bath; Barry A. Matrana, Akron, all of Ohio

[73] Assignee: The Goodyear Tire & Rubber Company, Akron, Ohio

[*] Notice: The portion of the term of this patent subsequent to Jul. 27, 2010 has been disclaimed.

[21] Appl. No.: 94,736

[22] Filed: Jul. 22, 1993

Related U.S. Application Data

[63] Continuation-in-part of Ser. No. 864,264, Apr. 6, 1992, Pat. No. 5,231,153.

[51] Int. Cl.$^5$ .............. C08F 4/48; C08F 4/50; C08F 136/08; C08F 236/10
[52] U.S. Cl. .................... 526/181; 526/173; 526/183; 526/209; 526/340; 526/340.2; 502/156
[58] Field of Search ............ 526/173, 181, 183, 209, 526/340.2, 340; 502/156

[56] References Cited

U.S. PATENT DOCUMENTS

| | | | |
|---|---|---|---|
| 3,639,380 | 2/1972 | Screttas | 260/94.9 R |
| 3,847,883 | 11/1974 | Kamienski et al. | 260/83.7 |
| 4,367,325 | 1/1983 | Takeuchi et al. | 526/340 |
| 4,429,091 | 1/1984 | Hall | 526/181 |
| 4,554,334 | 11/1985 | Yuki et al. | 526/177 |
| 4,647,635 | 3/1987 | Hall | 526/181 |
| 5,112,929 | 5/1992 | Hall | 526/181 |
| 5,231,153 | 7/1993 | Hsu et al. | 526/181 |

*Primary Examiner*—Fred Teskin
*Attorney, Agent, or Firm*—Alvin T. Rockhill

[57] ABSTRACT

It has been unexpectedly discovered that various compounds, such as alkyl tetrahydrofurfuryl ethers, can be used to modify anionic polymerizations of conjugated diene monomers. These modifiers can be used to polymerize isoprene monomer into high 3,4-polyisoprene at excellent polymerization rates. This is in contrast to the modifiers such as tetramethylethylene diamine which are typically used to modify such polymerizations. This invention more specifically discloses a process for the synthesis of 3,4-polyisoprene which comprises polymerizing isoprene monomer in an organic solvent in the presence of a catalyst system which is comprised of (a) a lithium initiator and (b) a modifier which is an alkyl-tetrahydrofurfuryl ether selected from the group consisting of ethyltetrahydrofurfuryl ether, propyltetrahydrofurfuryl ether, and butyltetrahydrofurfuryl ether. In the practice of this invention, the utilization of ethyltetrahydrofurfuryl ether is highly preferred since its use results in faster polymerization rates and higher vinyl contents in the resultant polymer.

10 Claims, No Drawings

ALKYL TETRAHYDROFURFURYL ETHERS AS ANIONIC POLYMERIZATION MODIFIER IN THE SYNTHESIS OF RUBBERY POLYMER

This is a continuation-in-part application of U.S. patent application Ser. No. 07/864,264, filed on Apr. 6, 1992 (now issued as U.S. Pat. No. 5,231,153).

BACKGROUND OF THE INVENTION

It is important for polydienes which are used in many applications to have high vinyl contents. For example, 3,4-polyisoprene can be used in tire tread compounds to improve tire performance characteristics, such as traction. Polar modifiers are commonly used in the preparation of synthetic polydiene rubbers which are prepared utilizing lithium catalyst systems in order to increase their vinyl content. Ethers and tertiary amines which act as Lewis bases are commonly used as modifiers. For instance, U.S. Pat. No. 4,022,959 indicates that diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine can be used as modifiers. U.S. Pat. No. 4,696,986 describes the use of 1,2,3-trialkoxybenzenes and 1,2,4-trialkoxybenzenes as modifiers. The vinyl group content of polydienes prepared utilizing Lewis bases as modifiers depends upon the type and amount of Lewis base employed as well as the polymerization temperature utilized. For example, if a higher polymerization temperature is employed, a polymer with a lower vinyl group content is obtained (see A. W. Langer; A. Chem. Soc. Div. Polymer Chem. Reprints; Vol. 7 (1), 132 [1966]). For this reason it is difficult to synthesize polymers having high vinyl contents at high polymerization temperatures utilizing typical Lewis base modifiers.

Higher temperatures generally promote a faster rate of polymerization. Accordingly, it is desirable to utilize moderately high temperatures in commercial polymerizations in order to maximize throughputs. However, it has traditionally been difficult to prepare polymers having high vinyl contents at temperatures which are high enough to attain maximum polymerization rates while utilizing conventional Lewis bases as modifiers.

SUMMARY OF THE INVENTION

It has been determined that alkyl tetrahydrofurfuryl ether compounds having the structural formula:

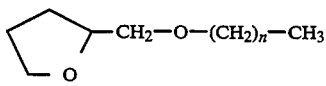

wherein n is an integer from 1 to 5, can be used as modifiers in the synthesis of polydienes. Some specific examples of alkyl tetrahydrofurfuryl ethers which can be used include ethyltetrahydrofurfuryl ether, propyltetrahydrofurfuryl ether, and butyltetrahydrofurfuryl ether. Ethyltetrahydrofurfuryl ether is highly preferred because its utilization results in the fastes polymerization rates and the highest vinyl contents.

Such polydienes are prepared utilizing initiators which are based on lithium, sodium, potassium, magnesium, or barium. As a general rule, organolithium compounds are preferred. The modifiers of this invention are very strong modifiers; the use of which can result in the formation of polymers with very high vinyl contents.

The modifiers of this invention remain stable at conventional polymerization temperatures and lead to the formation of polymers having high vinyl contents at such temperatures. Accordingly, they can be used to promote the formation of high vinyl polymers at temperatures which are high enough to promote very fast polymerization rates.

The present invention specifically discloses a process for the synthesis of a rubbery polymer which comprises polymerizing (1) from about 50 weight percent to 100 weight percent conjugated diene monomers and (2) from 0 weight percent to about 50 weight percent monomers which are copolymerizable or terpolymerized with said conjugated diene monomers, in an inert organic solvent in the presence of a catalyst system which is comprised of (a) an initiator selected from the group consisting of organolithium compounds, organosodium compounds, organomagnesium compounds, and organobarium compounds and (b) a modifier selected from the group consisting of ethyl tetrahydrofurfuryl ether, propyl tetrahydrofurfuryl ether, and butyl tetrahydrofurfuryl ether.

The subject invention also discloses a catalyst system which is particularly useful in the anionic polymerization of conjugated diene monomers into polymers which is comprised of (a) an initiator which is selected from the group consisting of organolithium compounds, organosodium compounds, organopotassium compounds, organomagnesium compounds, and organobarium compounds and (b) a modifier selected from the group consisting of ethyltetrahydrofurfuryl ether, propyltetrahydrofurfuryl ether, and butyltetrahydrofurfuryl ether.

DETAILED DESCRIPTION OF THE INVENTION

The polymers which can be prepared utilizing the alkyl tetrahydrofurfuryl ether modifiers of the present invention are normally organolithium-initiated, vinyl group containing polymers of at least one diolefin monomer which are generally rubbery (elastomeric) polymers. The diolefin monomers utilized in the preparation of such polymers normally contain from 4 to 12 carbon atoms with those containing from 4 to 8 carbon atoms being more commonly utilized. The diolefin monomers used in such polymers are normally conjugated diolefins.

The conjugated diolefin monomers which are utilized in the synthesis of such polymers generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Feed stocks which are comprised of one or more conjugated diolefin monomers in admixture with other low molecular weight hydrocarbons can be utilized. Such admixtures, termed low concentration diene streams, are obtainable from a variety of refinery product streams, such as naptha-cracking operations or can be intentionally blended compositions. Some typical examples of low molecular weight hydrocarbons which can be admixed with diolefin monomers, such as 1,3-butadiene, in the polymerization feed include propane, propylene, isobutane, n-butane, 1-butene, isobutylene, trans-2-butene, cis-2-butene, vinylacetylene, cyclohexane, ethylene, propylene, and the like.

Copolymers of one or more diolefin monomers having high vinyl contents can also be prepared utilizing the modifiers of the present invention. For instance, copolymers of isoprene and butadiene having high vinyl contents can be synthesized.

Polydiene rubbers having high vinyl contents which are copolymers or terpolymers of diolefin monomers with one or more other ethylenically unsaturated monomers which are copolymerizable with diolefin monomers can also be prepared utilizing the modifiers of this invention. Some representative examples of ethylenically unsaturated monomers that can potentially be synthesized into such high vinyl polymers include alkyl acrylates, such as methyl acrylate, ethyl acrylate, butyl acrylate, methyl methacrylate and the like; vinylidene monomers having one or more terminal $CH_2=CH$- groups; vinyl aromatics such as styrene, $\alpha$-methylstyrene, bromostyrene, chlorostyrene, fluorostyrene and the like; $\alpha$-olefins such as ethylene, propylene, 1-butene, and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like; vinyl esters, such as vinyl acetate; $\alpha,\beta$-olefinically unsaturated nitriles, such as acrylonitrile and methacrylonitrile; $\alpha,\beta$-olefinically unsaturated amides, such as acrylamide, N-methyl acrylamide, N,N-dimethylacrylamide, methacrylamide and the like.

Polydiene rubbers which are copolymers of one or more diene monomers with one or more other ethylenically unsaturated monomers will normally contain from about 50 weight percent to about 99 weight percent diene monomers and from about 1 weight percent to about 50 weight percent of the other ethylenically unsaturated monomers in addition to the diene monomers. For example, copolymers of diene monomers with vinylaromatic monomers, such as styrene-butadiene rubber (SBR) which contain from 50 to 95 weight percent diene monomers and from 5 to 50 weight percent vinylaromatic monomers are useful in many applications.

Vinyl aromatic monomers are probably the most important group of ethylenically unsaturated monomers which are commonly incorporated into polydienes. Such vinyl aromatic monomers are, of course, selected so as to be copolymerizable with the diolefin monomers being utilized. Generally, any vinyl aromatic monomer which is known to polymerize with organolithium initiators can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The relative amount of conjugated diene or dienes and monovinyl aromatic compound or compounds employed can vary over a wide range. In preparing rubbery polymers, the proportion of the conjugated diene versus the monovinyl-substituted aromatic compound should be sufficient so as to result in a substantially rubbery or elastomeric copolymer product. There is no sharp break point as to the amount of conjugated diene versus monovinyl-substituted aromatic compound that confers rubbery or elastomeric properties on the resulting copolymer, though in general at least 50 parts by weight of conjugated diene are required on an exemplary basis. Thus, for a rubbery copolymer, as is preferred in accordance with this invention, the weight ratio of conjugated diene to monovinyl aromatic compound in the monomer charge would be in the range of about 50:50 to 95:5. Of course, mixtures of conjugated dienes as well as mixtures of monovinyl-substituted aromatic compounds can be utilized.

The polymerizations of the present invention which are carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture. The modifiers of this invention are also useful in bulk polymerizations which are initiated with lithium catalyst systems.

In solution polymerizations which utilize the modifiers of this invention, there will normally be from 5 to 35 weight percent monomers in the polymerization medium. Such polymerization mediums are, of course, comprised of an organic solvent, monomers, an organolithium initiator, and the modifier. In most cases it will be preferred for the polymerization medium to contain from 10 to 30 weight percent monomers. It is generally more preferred for the polymerization medium to contain 20 to 25 weight percent monomers.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compounded with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compounded with 1,3-butadiene, on a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R (Li)$_x$ wherein R represents a hydrocarbyl radical of such as 1 to 20 carbon atoms per R group, and x is an integer of 1 to 4. Exemplary organolithium compounds are methyllithium, isopropyllithium, n-butyllithium, sec-butyllithium, tern-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The modifiers which can be employed in the synthesis of polydienes having high vinyl contents in accordance with this invention have the structural formulae:

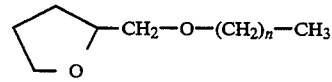

wherein n is an integer from 1 to 5. It is preferred for n to be an integer from 1 to 3 and most preferred for n to be 1.

The most preferred alkyl tetrahydrofurfuryl ether modifiers are ethyltetrahydrofurfuryl ether, propyltetrahydrofurfuryl ether, and butyltetrahydrofurfuryl ether. Ethyltetrahydrofurfuryl ether is the most preferred modifier.

The modifier being utilized can be introduced into the polymerization zone being utilized in any manner. In one embodiment, it can be reacted with the organometallic compound with the reaction mixture therefrom being introduced into the polymerization zone as the initiator. In another embodiment, the modifier can be introduced into the polymerization zone directly without first being reacted with the organometallic compound being utilized as the initiator. In other words, the modifiers can be introduced into the polymerization zone in the form of a reaction mixture with the organometallic initiator or they can be introduced into the polymerization zone separately.

The amount of modifier needed will vary greatly with the vinyl content which is desired for the polymer being synthesized. For instance, polymers with only slightly increased vinyl contents can be prepared by utilizing as little as 0.1 moles of the modifier per mole of metal in the organometallic initiator being utilized. If polymers having very high vinyl contents are desired, then large quantities of the modifier can be used. However, normally there will be no reason to employ more than about 40 moles of the modifier per mole of metal in the organometallic initiator system employed. In most cases from about 0.25 to about 15 moles of the modifier will be employed per mole of metal in the organometallic initiator system utilized. Preferably from about 0.5 to 10 moles of the modifier will be utilized per mole of lithium with from about 1 to 5 moles of the modifier per mole of lithium being most preferred.

The polymerization temperature utilized can vary over a broad range of from about −20° C. to about 150° C. In most cases a temperature within the range of about 30° C. to about 125° C. will be utilized. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde containing aliphatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

The preferred multihalides are silicon tetrahalides, such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents. Difunctional counterparts of these agents also can be employed, whereby a linear polymer rather than a branched polymer results.

Broadly, and exemplarily, a range of about 0.01 to 4.5 milliequivalents of coupling agent are employed per 100 grams of monomer, presently preferred about 0.01 to 1.5 to obtain the desired Mooney viscosity. The larger quantities tend to result in production of polymers containing terminally reactive groups or insufficient coupling. One equivalent of treating agent per equivalent of lithium is considered an optimum amount for maximum branching, if this result is desired in the production line. The coupling agent can be added in hydrocarbon solution, e.g., in cyclohexane, to the polymerization admixture in the final reactor with suitable mixing for distribution and reaction.

Polymers which are made by utilizing the modifiers of this invention in solution polymerizations can be recovered utilizing conventional techniques. In many cases it will be desirable to destroy residual carbon-lithium bonds which may be present in the polymer solution and to recover the synthetic polymer produced. It may also be desirable to add additional antioxidants to the polymer solution in order to further protect the polydiene produced from potentially deleterious effects of contact with oxygen. The polymer made can be precipitated from the polymer solution and any remaining lithium moieties can be inactivated by the addition of lower alcohols, such as isopropyl alcohol, to the polymer solution. The polydiene can be recovered from the solvent and residue by means such as decantation, filtration, centrification, and the like. Steam stripping can also be utilized in order to remove volatile organic compounds.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment polyisoprene having a high 3,4-microstructure was synthesized using ethyl tetrahydrofurfuryl ether as the modifier. In the procedure used 1,500 grams of a silica/molecular sieve/aluminum dried premix containing 19.4 percent isoprene in hexane was charged into a one gallon (3.8 liters) reactor. After the scavenger level of 2.9 ppm, as determined, 0.64 ml of neat ETE (ethyl tetrahydrofurfuryl ether; 7.2M) and 1.65 ml of a 0.75M solution of n-butyl lithium (in hexane; 1.3 ml for initiation and 0.35 ml for scavenging the premix) was added to the reactor. The molar ratio of modifier/n-butyl lithium (n-BuLi) was 5. The polymerization was allowed to proceed at 70° C. for 1 hour. Analysis of the residual monomers contained in the polymerization mixture by gas chromatograph indicated that the polymerization was 96.5% complete at this time. The polymerization was continued for another 30 minutes to assure 100% conversion. Then, 5 ml of 1M ethanol solution (in hexane) was added to the reactor to shortstop the polymerization and polymer was removed from the reactor and stabilized with 1 phm of antioxidant. After evaporating hexane, the resulting polymer was dried in a vacuum oven at 50° C. The polyisoprene produced was determined to have a glass transition temperature (Tg) at −9° C. It was determined to have a microstructure which contained 31% 1,4-polyisoprene units, 64% 3,4-polybutadiene units and 6% 1,2-polyisoprene units.

EXAMPLES 2-5

The procedure described in Example 1 was utilized in these examples except that the ETE/n-BuLi ratios were changed from 5 to 0.5-3. The Tg's and microstructures of the resulting polyisoprenes are listed in Table I.

TABLE I

| | Polyisoprenes Prepared Via ETE/n-BuLi | | | | | |
|---|---|---|---|---|---|---|
| Example No. | ETE/n-BuLi Ratio | PZN* Temp. | Tg (°C.) | Microstructure | | |
| | | | | 1,4-PI | 3,4-PI | 1,2-PI |
| 1 | 5.0 | 70° C. | −9 | 31 | 64 | 5 |
| 2 | 3.0 | 70° C. | −15 | 37 | 57 | 6 |
| 3 | 2.0 | 70° C. | −23 | 41 | 52 | 7 |

TABLE I-continued

| | Polyisoprenes Prepared Via ETE/n-BuLi | | | | | |
|---|---|---|---|---|---|---|
| Example No. | ETE/n-BuLi Ratio | PZN* Temp. | Tg (°C.) | Microstructure | | |
| | | | | 1,4-PI | 3,4-PI | 1,2-PI |
| 4 | 1.0 | 70° C. | −38 | 60 | 37 | 3 |
| 5 | 0.5 | 70° C. | −53 | 81 | 19 | 0 |
| 6 | 5.0 | 60° C. | 0 | 24 | 66 | 10 |

*PZN Temp. = Polymerization Temperature

EXAMPLE 6

The procedure described in Example 1 was utilized in this example except that the polymerization temperature was changed from 70° C. to 60° C. The polyisoprene produced was determined to have a Tg at 0° C. It was determined to have a microstructure which contained 24% 1,4-polyisoprene units, 66% 3,4-polybutadiene units and 11% 1,2-polyisoprene units.

EXAMPLES 7-11

The procedure described in Example 1 was utilized in these examples except that MTE (methyl tetrahydrofurfuryl ether) was used as the modifier. The Tg's of the polyisoprenes produced along with the MTE/n-BuLi ratios utilized are tabulated in Table II.

TABLE II

| | Polyisoprenes Prepared Via MTE/n-BuLi | | | | | |
|---|---|---|---|---|---|---|
| Example No. | MTE/n-BuLi Ratio | PZN Temp. | Tg (°C.) | Microstructure | | |
| | | | | 1,4-PI | 3,4-PI | 1,2-PI |
| 7 | 1.0 | 70° C. | −39 | 62 | 37 | 1 |
| 8 | 2.0 | 70° C. | −26 | 48 | 49 | 3 |
| 9 | 3.0 | 70° C. | −19 | 42 | 54 | 4 |
| 10 | 5.0 | 70° C. | −14 | 36 | 58 | 6 |
| 11 | 10.0 | 70° C. | −7 | 30 | 63 | 7 |

EXAMPLES 12-16

The procedure described in Example 1 was utilized in these examples except that BTE (butyl tetrahydrofurfuryl ether) was used as the modifier. The Tg's of the polyisoprenes produced along with the BTE/n-BuLi ratios utilized are tabulated in Table III.

TABLE III

| | Polyisoprenes Prepared Via BTE/n-BuLi | | | | | |
|---|---|---|---|---|---|---|
| Example No. | BTE/n-BuLi Ratio | PZN Temp. | Tg (°C.) | Microstructure | | |
| | | | | 1,4-PI | 3,4-PI | 1,2-PI |
| 12 | 1.0 | 70° C. | −35 | 58 | 40 | 2 |
| 13 | 2.0 | 70° C. | −22 | 45 | 52 | 3 |
| 14 | 3.0 | 70° C. | −15 | 39 | 57 | 4 |
| 15 | 5.0 | 70° C. | −9 | 33 | 62 | 5 |
| 16 | 10.0 | 70° C. | −4 | 29 | 64 | 7 |

EXAMPLES 17-21

The procedure described in Example 1 was utilized in these examples except that MTE (methyl tetrahydrofurfuryl ether) was used as the modifier and a 50/50 mixture of isoprene/1,3-butadiene was used as premix. The Tg's of the IBR's produced along with the MTE/n-BuLi ratios utilized are tabulated in Table IV.

TABLE IV

50/50 Isoprene-Butadiene Copolymers
Prepared Via MTE/n-BuLi at 70° C.

| Example No. | MTE/n-BuLi Ratio | Tg (°C.) | Microstructure (%) | | | | |
|---|---|---|---|---|---|---|---|
| | | | 1,2-PBd | 1,4-PBd | 1,2-PI | 3,4-PI | 1,4-PI |
| 17 | 1.0 | −48 | 24 | 27 | ND | 27 | 22 |
| 18 | 2.0 | −39 | 28 | 23 | 2 | 31 | 16 |
| 19 | 3.0 | −37 | 31 | 22 | 2 | 31 | 14 |
| 20 | 5.0 | −32 | 32 | 19 | 4 | 34 | 11 |
| 21 | 10.0 | −30 | 32 | 19 | 5 | 34 | 10 |

EXAMPLES 22–25

The procedure described in Example 1 was utilized in these examples except a 20/80 mixture of styrene/1,3-butadiene was used as the premix. The Tg's of the SBR's produced, the ETE/n-BuLi ratios utilized and their microstructures are tabulated in Table V. The ozonolysis data indicated that the styrene was randomly distributed in the resulting SBR chains.

TABLE V

20/80 Styrene-Butadiene Copolymers
Prepared Via ETE/n-BuLi

| Example No. | ETE/n-BuLi Ratio | Tg (°C.) | Microstructure (%) | | |
|---|---|---|---|---|---|
| | | | 1,2-PBd | 1,4-PBd | Styrene* |
| 22 | 1.0 | −40 | 43 | 36 | 21 |
| 23 | 2.0 | −30 | 52 | 28 | 20 |
| 24 | 3.0 | −28 | 53 | 28 | 19 |
| 25 | 5.0 | −24 | 55 | 26 | 19 |

*Random

EXAMPLES 26–27

The procedure described in Example 1 was utilized in these examples except a 10/90 mixture of styrene/1,3-butadiene was used as the premix. The Tg's of the SBR's produced, the ETE/n-BuLi ratios utilized and their microstructures are tabulated in Table VI. The ozonolysis data indicated that the styrene was randomly distributed in the resulting SBR chains.

TABLE VI

10/90 Styrene-Butadiene Copolymers
Prepared Via ETE/n-BuLi

| Example No. | ETE/n-BuLi Ratio | Tg (°C.) | Microstructure (%) | | |
|---|---|---|---|---|---|
| | | | 1,2-PBd | 1,4-PBd | Styrene* |
| 26 | 1.0 | −45 | 51 | 38 | 11 |
| 27 | 2.0 | −37 | 58 | 33 | 9 |

*Random

EXAMPLES 28–29

The procedure described in Example 1 was utilized in these examples except a 10/90 mixture of styrene/1,3-butadiene was used as the premix and MTE (methyl tetrahydrofurfuryl ether) was used as the modifier. The Tg's of the SBR's produced along with the MTE/n-BuLi ratios utilized are listed in Table VII.

TABLE VII

10/90 Styrene-Butadiene Copolymers
Prepared Via MTE/n-BuLi

| Example No. | MTE/n-BuLi Ratio | Tg (°C.) | Microstructure (%) | | |
|---|---|---|---|---|---|
| | | | 1,2-PBd | 1,4-PBd | Styrene* |
| 28 | 1.0 | −54 | 41 | 48 | 11 |

TABLE VII-continued

10/90 Styrene-Butadiene Copolymers
Prepared Via MTE/n-BuLi

| Example No. | MTE/n-BuLi Ratio | Tg (°C.) | Microstructure (%) | | |
|---|---|---|---|---|---|
| | | | 1,2-PBd | 1,4-PBd | Styrene* |
| 29 | 2.0 | −44 | 49 | 41 | 10 |

*Random

EXAMPLES 30–33

The procedure described in Example 1 was utilized in these examples except that the polymerization temperature was changed from 70° C. to 60° C. and butadiene was used as the premix. The Tg's, the ETE/n-BuLi ratios and the microstructures of the resulting polybutadienes are tabulated in Table VIII.

TABLE VIII

Polybutadienes Prepared Via ETE/n-BuLi

| Example No. | ETE/n-BuLi Ratio | Tg (°C.) | Microstructure (%) | |
|---|---|---|---|---|
| | | | 1,2-PBd | 1,4-PBd |
| 30 | 2.0 | −41 | 71 | 29 |
| 31 | 3.0 | −39 | 76 | 24 |
| 32 | 5.0 | −36 | 76 | 24 |
| 33 | 10.0 | −34 | 78 | 22 |
| 34 | 10.0 | −30 | 80 | 20 |

EXAMPLE 34

The procedure described in Example 1 was utilized in this example except that the polymerization temperature was changed from 70° C. to 60° C. and butadiene was used as the premix. The ETE/n-BuLi ratio was changed from 5 to 10. The polybutadiene produced was determined to have a Tg at −30° C.. It was determined to have a microstructure which contain 80% 1,2-polybutadiene units and 20% 1,4-polybutadiene units.

EXAMPLES 35–39

The procedure described in Example 1 was utilized in these examples except that butadiene was used as the premix, MTE (methyl tetrahydrofurfuryl ether) was used as the modifier and polymerization was performed at 60° C. The Tg's of the polybutadienes produced along with the MTE/n-BuLi ratios utilized are listed in Table IX.

TABLE IX

Polybutadienes Prepared Via MTE/n-BuLi

| Example No. | ETE/n-BuLi Ratio | Tg (°C.) | Microstructure (%) | |
|---|---|---|---|---|
| | | | 1,2-PBd | 1,4-PBd |
| 35 | 1.0 | −53 | 58 | 42 |
| 36 | 2.0 | −52 | 60 | 40 |
| 37 | 3.0 | −45 | 66 | 34 |
| 38 | 5.0 | −41 | 70 | 30 |
| 39 | 10.0 | −40 | 70 | 30 |

EXAMPLES 40–41

The procedure described in Example 1 was utilized in these examples except that PTE (propyl tetrahydrofurfuryl ether) was used as the modifier. The Tg's of the polyisoprenes produced along with the PTE/n-BuLi ratios utilized are tabulated in Table X.

TABLE X

| | Polyisoprenes Prepared Via PTE/n-BuLi | | | | | |
|---|---|---|---|---|---|---|
| Example No. | PTE/n-BuLi Ratio | PZN Temp. | Tg (°C.) | Microstructure | | |
| | | | | 1,4-PI | 3,4-PI | 1,2-PI |
| 40 | 3.0 | 70 | −22 | 43 | 54 | 3 |
| 41 | 5.0 | 70 | −11 | 34 | 60 | 6 |

EXAMPLE 42

The procedure described in Example 1 was utilized in these examples except a 10/90 mixture of styrene/1,3-butadiene was used as the premix and PTE (propyl tetrahydrofurfuryl ether) was used as the modifier. The Tg of the SBR produced along with the PTE/n-BuLi ratio utilized is listed in Table XI.

TABLE XI

| | 10/90 Styrene-Butadiene Copolymers Prepared Via PTE/n-BuLi | | | | |
|---|---|---|---|---|---|
| Example No. | PTE/n-BuLi Ratio | Tg (°C.) | Microstructure (%) | | |
| | | | 1,2-PBd | 1,4-PBd | Styrene* |
| 42 | 1.0 | −54 | 45 | 45 | 10 |

*Random

EXAMPLE 43

The procedure described in Example 1 was utilized in these examples except a 10/90 mixture of styrene/1,3-butadiene was used as the premix and BTE (butyl tetrahydrofurfuryl ether) was used as the modifier. The Tg of the SBR produced along with the BTE/n-BuLi ratio utilized is listed in Table XII.

TABLE XII

| | 10/90 Styrene-Butadiene Copolymers Prepared Via BTE/n-BuLi | | | | |
|---|---|---|---|---|---|
| Example No. | BTE/n-BuLi Ratio | Tg (°C.) | Microsturcture (%) | | |
| | | | 1,2-PBd | 1,4-PBd | Styrene* |
| 43 | 1.0 | −56 | 44 | 46 | 10 |

*Random

EXAMPLE 44

The procedure described in Example 1 was utilized in this example except a 25/50/25 mixture of styrene/isoprene/1,3-butadiene was used as the premix and ETE (ethyl tetrahydrofurfuryl ether) was used as the modifier. The Tg of the SIBR produced along with the ETE/n-BuLi ratio utilized is listed in Table XIII.

TABLE XIII

| | 25/50/25 Styrene-Isoprene/Butadiene Copolymers Prepared Via ETE/N-BuLi | | | | | | |
|---|---|---|---|---|---|---|---|
| Example No. | ETE/n-BuLi Ratio | Tg (°C.) | Microstructure (%) | | | | |
| | | | 1,2-PBd | 1,4-PBd | 1,2-PI | 3,4-PI | 1,4-PI | Styrene* |
| 44 | 0.75 | −22 | 16 | 13 | 1 | 29 | 15 | 26 |

*Random

While certain representative embodiments and details have been shown for the purpose of illustrating the subject invention, it will be apparent to those skilled in this art that various changes and modifications can be made therein without departing from the scope of the subject invention.

What is claimed is:

1. A process for the synthesis of a rubbery polymer which comprises copolymerizing styrene and isoprene in an inert organic solvent in the presence of a catalyst system which is comprised of (a) an initiator selected from the group consisting of organolithium compounds, organosodium compounds, organomagnesium compounds, and organobarium compounds, and (b) a modifier selected from the group consisting of ethyl tetrahydrofurfuryl ether, propyl tetrahydrofurfuryl ether and butyl tetrahydrofurfuryl ether.

2. A process for the synthesis of a rubbery polymer which comprises terpolymerizing 1,3-butadiene, isoprene, and styrene in an inert organic solvent in the presence of a catalyst system which is comprised of (a) an initiator selected from the group consisting of organolithium compounds, organosodium compounds, organomagnesium compounds, and organobarium compounds, and (b) a modifier selected from the group consisting of ethyl tetrahydrofurfuryl ether, propyl tetrahydrofurfuryl ether and butyl tetrahydrofurfuryl ether.

3. A process for the synthesis of a rubbery polyisoprene polymer which comprises polymerizing isoprene monomer into polyisoprene having a high level of 3,4-microstructure in an inert organic solvent in the presence of a catalyst system which is comprised of (a) an initiator selected from the group consisting of organolithium compounds, organosodium compounds, organomagnesium compounds, and organobarium compounds, and (b) a modifier selected from the group consisting of ethyl tetrahydrofurfuryl ether, propyl tetrahydrofurfuryl ether and butyl tetrahydrofurfuryl ether.

4. A process as specified in claim 3 wherein the initiator is an organolithium compound and wherein the modifier is an ethyl tetrahydrofurfuryl ether.

5. A process as specified in claim 4 wherein said polymerization is conducted at a temperature which is within the range of about −20° C. to about 150° C.

6. A process as specified in claim 4 wherein said polymerization is carried out at a temperature which is within the range of about 30° C. to about 125° C.

7. A process as specified in claim 6 wherein from about 0.01 phm to about 0.1 phm of the organolithium initiator is present.

8. A process as specified in claim 6 wherein from about 0.25 to about 15 moles of ethyl tetrahydrofurfuryl ether is employed per mole of lithium in the modifier.

9. A process as specified in claim 6 wherein from about 0.5 to about 10 moles of ethyl tetrahydrofurfuryl ether is employed per mole of lithium in the modifier.

10. A process as specified in claim 6 wherein from about 1 to about 5 moles of ethyl tetrahydrofurfuryl ether is employed per mole of lithium in the modifier.

* * * * *